(12) United States Patent
Gokyu et al.

(10) Patent No.: US 9,639,882 B2
(45) Date of Patent: May 2, 2017

(54) METHOD FOR TREAD SELECTION

(71) Applicant: BRIDGESTONE CORPORATION, Chuo-ku, Tokyo (JP)

(72) Inventors: Syunsuke Gokyu, Kodaira (JP); Takashi Tomomoto, Kodaira (JP); Kenjiro Yanai, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 175 days.

(21) Appl. No.: 14/018,049

(22) Filed: Sep. 4, 2013

(65) Prior Publication Data
US 2014/0067599 A1 Mar. 6, 2014

(30) Foreign Application Priority Data

Sep. 5, 2012 (JP) .................................. 2012-195264

(51) Int. Cl.
G06Q 30/00 (2012.01)
G06Q 30/06 (2012.01)
(Continued)

(52) U.S. Cl.
CPC ........ *G06Q 30/0631* (2013.01); *B60C 11/246* (2013.01); *B60C 19/00* (2013.01); *B60C 99/006* (2013.04)

(58) Field of Classification Search
CPC .... G06Q 30/06–30/0645; G06Q 30/08; G06Q 10/087; G06Q 30/00; G06Q 30/02;
(Continued)

(56) References Cited

U.S. PATENT DOCUMENTS

2005/0150283 A1* 7/2005 Shick et al. .................... 73/146
2013/0262363 A1* 10/2013 Kimura et al. ................. 706/46

FOREIGN PATENT DOCUMENTS

CA 2701783 A1 * 4/2009 ............ G01M 17/02
EP 2 123 487 A1 11/2009
(Continued)

OTHER PUBLICATIONS

Sasikumar, "A multi-echelon reverse logistics network design for product recovery—a case of truck tire remanufacturing," The International Journal of Advanced Manufacturing Technology, Aug. 2010, vol. 49, Issue 9-12, pp. 1223-1234.*
(Continued)

*Primary Examiner* — Adam Levine
(74) *Attorney, Agent, or Firm* — Sughrue Mion, PLLC

(57) ABSTRACT

A method for tread selection to select a tread to attach to a tread side of a tire casing when manufacturing a tire includes the steps of: a) measuring, by a tire condition measurement unit, at least one characteristic value indicating at least one of a tire condition and a vehicle running condition; b) predicting, by a casing life prediction unit, a remaining life of the tire casing based on the at least one characteristic value measured in step a); c) selecting, by a tread selection unit, at least one recommended tread in accordance with the remaining life of the tire casing predicted in step b) from among a plurality of treads attachable to the tire casing, using wear life information calculated in advance for each of the treads; and d) displaying, by a terminal, the at least one recommended tread selected in step c).

9 Claims, 3 Drawing Sheets

(51) Int. Cl.
*B60C 11/24* (2006.01)
*B60C 19/00* (2006.01)
*B60C 99/00* (2006.01)

(58) Field of Classification Search
CPC ...... G06Q 10/20; G06Q 20/12; G06Q 20/203;
G06Q 30/01; G06Q 30/0241; G06Q
30/0253; G06Q 30/0278; G06Q 30/0282;
G06Q 30/0283
USPC .................................................. 705/26–27.2
See application file for complete search history.

(56) References Cited

FOREIGN PATENT DOCUMENTS

| | | |
|---|---|---|
| JP | 10-324120 A | 12/1998 |
| JP | 2012-096762 A | 5/2012 |
| JP | 2012-126174 A | 7/2012 |
| WO | 2012/081357 A1 | 6/2012 |

OTHER PUBLICATIONS

Extended European Search Report, dated Jan. 2, 2014, issued in European Patent Application No. 13182397.3.
Chinese Office Action, dated Aug. 18, 2014, issued in corresponding Chinese Patent Application No. 201310400150.7.

* cited by examiner

METHOD FOR TREAD SELECTION

CROSS REFERENCE TO RELATED APPLICATION

This application is based on an application No. 2012-195264 filed in Japan on Sep. 5, 2012, the contents of which are hereby incorporated by reference.

TECHNICAL FIELD

The present invention relates to a method for tread selection to select a tread to attach to the tread side of a tire casing when retreading the tire to manufacture a retreaded tire.

BACKGROUND ART

A retreaded tire that is manufactured by first attaching vulcanized tread rubber or unvulcanized tread material to a tire casing and then bonding by vulcanization has been proposed for a tire casing that has been used for a certain period of time and can be used repeatedly (for example, see JP2012-096762A (PTL 1)). By applying such techniques for retreaded tires, the casing can be used for an extended period of time, and the cost to the tire user can be effectively reduced.

A wide variety of treads can be used in tires, and treads can be selected from among a variety of thicknesses. Selecting a thin tread, for example, can reduce the rolling resistance coefficient, which greatly affects fuel consumption, yet the life of the tread shortens, thereby increasing retreading costs. Conversely, selecting a thick tread can lengthen the life of the tire and reduce retreading costs, yet the rolling resistance coefficient increases, causing fuel consumption to increase.

The tire user is thus unable to select an appropriate tread, and a tread that is still usable sometimes goes to waste.

CITATION LIST

Patent Literature

PTL 1: JP2012-096762A

SUMMARY OF INVENTION

The present invention has been conceived in light of the above problems and provides a method that can select an optimal tread for a tire.

The method for tread selection according to the present invention is for selecting a tread to attach to a tread side of a tire casing when manufacturing a tire and includes the steps of: a) measuring, by a tire condition measurement unit, at least one characteristic value indicating at least one of a tire condition and a vehicle running condition; b) predicting, by a casing life prediction unit, a remaining life of the tire casing based on the at least one characteristic value measured in step a); c) selecting, by a tread selection unit, at least one recommended tread in accordance with the remaining life of the tire casing predicted in step b) from among a plurality of treads attachable to the tire casing, using wear life information calculated in advance for each of the treads; and d) displaying, by a terminal, the at least one recommended tread selected in step c). When selecting two or more recommended treads, the remaining life of the tire casing corresponds to the total of the wear life for the two or more selected treads. Therefore, after attaching one of the recommended treads to the tire casing and using the tread, the user retreads the tire at least once with the other recommended tread(s). According to this method for tread selection, an optimal tread for a tire can be selected. By manufacturing the tire casing of the case portion separately from the tread portion attached to the tire casing, the present invention can be adopted not only for a retreaded tire, but also when producing a new tire.

The "remaining life of the tire casing" in the present description and in the claims refers to the remaining drivable distance of the tire from the time at which the remaining life is being predicted (hereinafter "the present") until the tire casing fails. Similarly, "attached" includes bonding by vulcanization. The "at least one characteristic value indicating at least one of a tire condition and a vehicle running condition" refers to at least one characteristic value for the temperature inside the tire or on the tire surface; the tire internal pressure; vehicle speed, driving distance, and position; engine speed; idling time; conditions of sudden acceleration/deceleration; and the like. For a vehicle on which a tire using a certain tread is mounted, the "tread wear life information" refers to the remaining drivable distance of the vehicle until the tread wears to the point of being unusable.

In the method for tread selection, in step c), the tread selection unit preferably selects the at least one recommended tread by further referring to user need information set in advance to reflect needs of a user of the tire. In this case, the tire user's needs can be fulfilled by selecting a recommended tread corresponding to the tire user's needs such as cost reduction, environmental emphasis, safe driving, and the like. The user need information can be established as follows. In the above case, for example, choices for user needs such as "cost reduction, environmental emphasis, safe driving" are set in advance, and based on information obtained from each user by interview or questionnaire, an optimal item (such as tread pattern) for the user is input for each of the choices.

In the method for tread selection, in step c), the tread selection unit preferably selects the at least one recommended tread by further referring to cost information set in advance for each of the treads and to a rolling resistance coefficient calculated in advance for a tire using each of the treads. In this case, for example a tire with a low tread cost and with good fuel efficiency due to a small rolling resistance coefficient can be selected. Note that the "tread cost information" also includes cost information for supplementary service such as maintenance of the tire.

In the method for tread selection, in step c), the tread selection unit preferably selects the at least one recommended tread by further referring to usage environment information set in advance to indicate a usage environment of the tire.

In the method for tread selection, in step c), the tread selection unit preferably selects the at least one recommended tread by further referring to maintenance cost information set in advance for the tire. In this case, a tread that more effectively reduces the cost for the tire's user can be selected. Note that the "maintenance cost information" includes not only cost information for tire retreading, but also vehicle maintenance cost information when using the tire.

In the method for tread selection, in step c), the tread selection unit preferably selects the at least one recommended tread by further referring to fuel cost information calculated in advance for a vehicle on which a tire using each of the treads is mounted. In this case, a tread that effectively reduces the fuel cost incurred by the tire's user can be selected. Note that the "fuel cost information" refers to information necessary, when using each of the treads on a retreaded tire, for calculating the fuel cost from selection of the recommended tread until the tire casing reaches the end of its life. For example, such information includes the price on diesel fuel and the fuel consumption when using each of the treads.

In the method for tread selection, in step c), the tread selection unit preferably selects the at least one recommended tread by further referring to carbon dioxide emission information calculated in advance for a vehicle on which a tire using each of the treads is mounted. In this case, a tread that reduces the carbon dioxide produced when using the vehicle can be selected. Note that the "carbon dioxide emission information" refers to information necessary, when using each of the treads on a tire, for calculating the carbon dioxide emission from selection of the recommended tread until the tire casing reaches the end of its life. For example, such information includes the fuel consumption when using each of the treads.

According to the method for tread selection of the present invention, an optimal tread for a tire can be selected.

BRIEF DESCRIPTION OF DRAWINGS

The present invention will be further described below with reference to the accompanying drawings, wherein.

DESCRIPTION OF EMBODIMENTS

With reference to the drawings, the following describes an embodiment of the present invention.

System Structure

Figure 1:
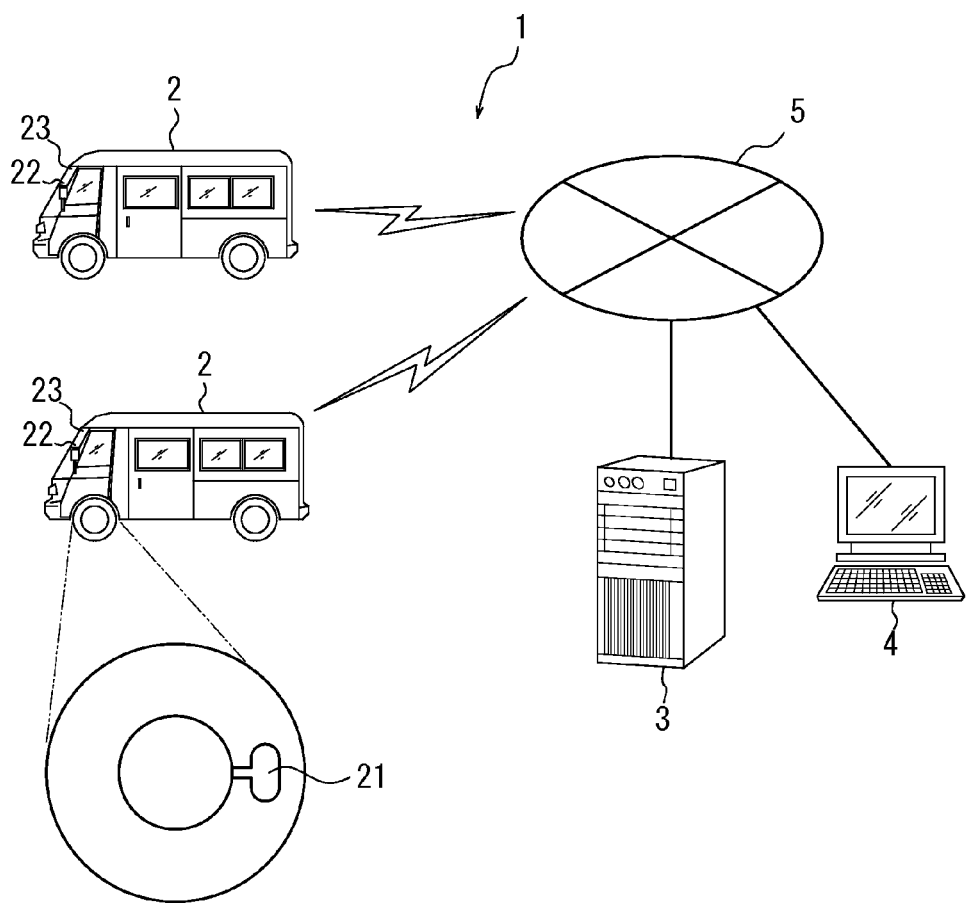
FIG. 1 illustrates the structure of a tread selection system used in an embodiment of the present invention.

FIG. 1 illustrates the structure of a tread selection system used in an embodiment of the method of the present invention. A tread selection system 1 is a suitable system for selecting a recommended tread for use in a tire. Note that in the description of the tread selection system of the present embodiment, the "user" refers to the person who operates a terminal and proposes or decides on a recommended tread for a tire, such as a tire vendor or a tire retreader. The tread selection system 1 is formed by a plurality of vehicles 2, a server 3, and at least one terminal 4. The server 3 is connected to and can communicate with each of the vehicles 2 and terminal 4 via a network 5. The vehicles 2 transmit information to the server 3 on at least one characteristic value indicating a tire condition, a vehicle running condition, or both. Examples of the network connecting the vehicles 2 and the server 3 include a radio link, a satellite channel, and the like. The server 3 selects a recommended tread for a tire and causes the terminal 4 to display the recommended tread. The terminal 4 receives and displays information such as the recommended tread selected by the server 3. As examples of the terminal 4, a variety of devices can be used, such as a PC, PDA, cellular phone, and the like. The server 3 and the terminal 4 may also be integrated. The interface between the server 3 and the terminal 4 may, for example, be achieved by establishing a Web server on the server 3, providing the terminal 4 with a Web browser, and communicating via HTTP or HTTPS.

Vehicle Structure

Figure 2:
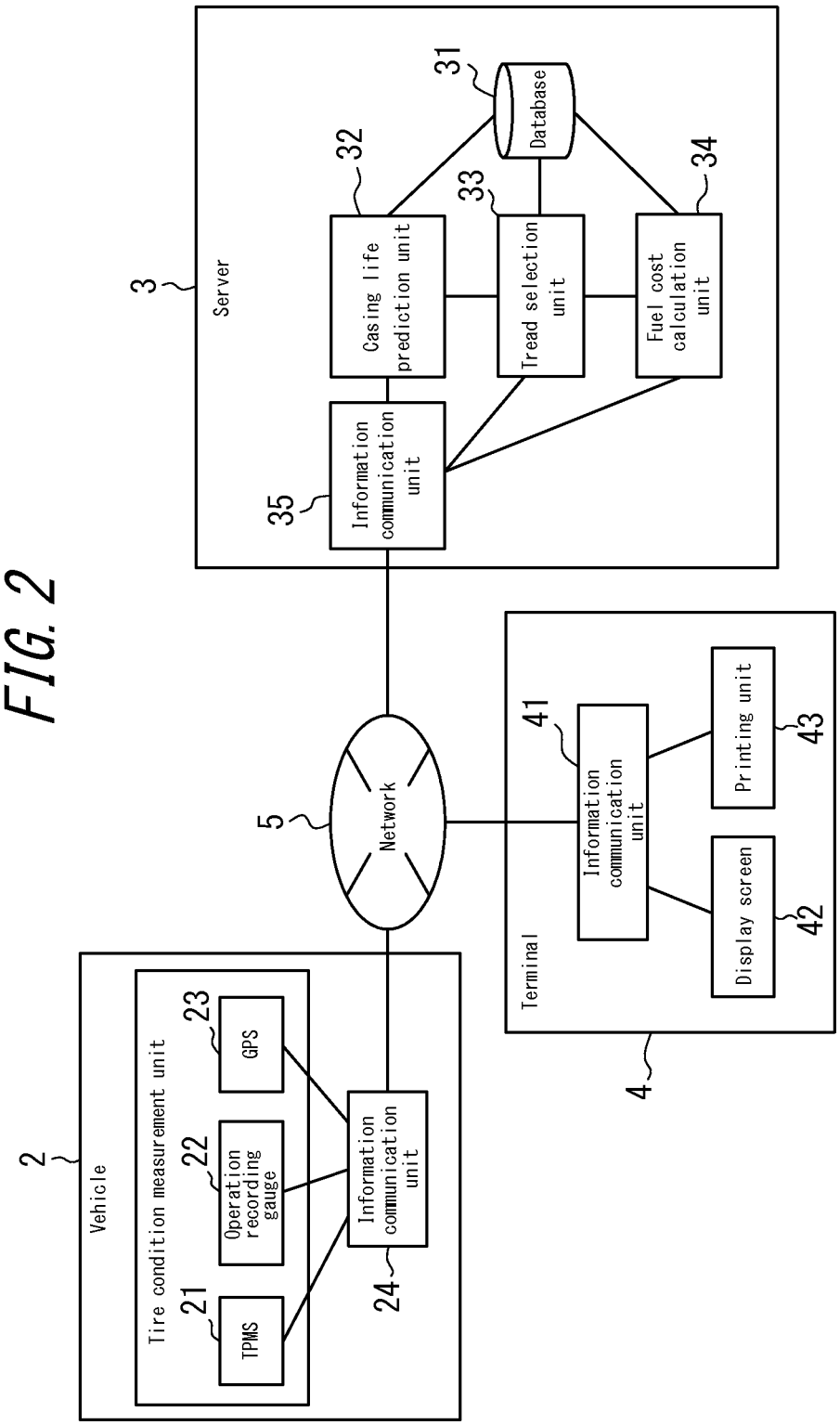
FIG. 2 is a functional block diagram illustrating the control structure of the tread selection system in FIG. 1.

As illustrated in FIGS. 1 and 2, each vehicle 2 includes a tire condition measurement unit that measures at least one characteristic value indicating a tire condition, a vehicle running condition, or both, and an information communication unit 24. The tire condition measurement unit includes a Tire Pressure Monitoring System ("TPMS 21"), an operation recording gauge 22, a GPS 23, and the like. These devices are merely examples, and the vehicle may be provided with other devices serving as the tire condition measurement unit. The TPMS 21 is attached to a wheel, valve, or the like on the vehicle 2 and measures internal pressure information and temperature information on the tire, the tire internal pressure application time, and the like. The information measured by the TPMS 21 is transmitted regularly to the information communication unit 24 of the vehicle 2 by radio. The operation recording gauge 22 measures the driving distance/speed, engine speed, idling time, vehicle acceleration, and the like for the vehicle 2. The GPS 23 measures the position of the vehicle 2. These pieces of information as well are transmitted to the information communication unit 24. The information communication unit 24 of the vehicle 2 communicates with the server 3 via the network 5.

Server Structure

As illustrated in FIG. 2, the server 3 includes a database 31, a casing life prediction unit 32, a tread selection unit 33, a fuel cost calculation unit 34, and an information communication unit 35. The database 31 stores various information necessary to select a recommended tread for a tire. For example, such information includes wear life information for a plurality of treads, user need information, tread cost information, the rolling resistance coefficient of a tire using each of the treads, usage environment information, maintenance cost information, fuel cost information, and the like. For example, wear life information, basic information on casing life (such as a physical property value limit of the casing), and the rolling resistance coefficient of the tire are set by the tire developer, whereas the user need information, tread cost information, maintenance cost information, fuel consumption information, and usage environment information are set by the tire vendor or retreader. The casing life prediction unit 32 predicts the remaining life of the tire casing based on the characteristic values indicating the tire condition, the vehicle running condition, or both. The tread selection unit 33 uses the tread wear life information stored in the database 31 to select one or more recommended treads in accordance with the remaining life of the casing predicted by the casing life prediction unit 32. Based on the fuel cost information stored in the database 31, the fuel cost calculation unit 34 calculates the fuel cost for the vehicle when mounting a tire using each of the treads onto the vehicle. The information communication unit 35 of the server 3 communicates with the vehicles 2 and the terminal 4 via the network 5.

Terminal Structure

As illustrated in FIG. 2, the terminal 4 includes an information communication unit 41, a display screen 42, and a printing unit 43. The information communication unit 41 has the function of sending and receiving information to and from the server 3 via the network 5. The information communication unit 41 may use a Web browser that can be connected to the Internet. Each recommended tread selected by the server 3 is displayed on the display screen 42. The printing unit 43 can print information such as the information displayed on the display screen 42.

Description of System Function

With reference to FIGS. 1 and 2, the system function to select a recommended tread to attach to the tire casing is described. Note that before performing the following function, it is assumed that a variety of information is stored in the database 31 of the server 3.

Prediction of Life of Tire Casing (1) The tire condition measurement unit measures at least one characteristic value indicating a tire condition, a vehicle running condition, or both. For example, the TPMS 21 measures the tire internal pressure and the air temperature at the tire inner surface, the operation recording gauge 22 measures the driving distance/speed, engine speed, idling time, and vehicle acceleration of the vehicle 2, and the GPS 23 measures the position of the vehicle 2.

(2) The information communication unit 24 of the vehicle 2 transmits each characteristic value measured by the TPMS 21, operation recording gauge 22, GPS 23, and the like of the tire condition measurement unit to the server 3. Note that along with each characteristic value, the information communication unit 24 can also transmit the time at which each characteristic value was measured, information identifying the vehicle 2, information identifying the tire measured by the tire condition measurement unit, and the like.

(3) The information communication unit 35 of the server 3 receives the at least one characteristic value indicating the tire condition, the vehicle running condition, or both. Based on each characteristic value, the casing life prediction unit 32 predicts the remaining life of the tire casing, i.e. the remaining drivable distance of the vehicle, on which the tire is mounted, until the tire casing fails. For example, based on the tire condition information, the casing life prediction unit 32 first estimates the temperature history of a specific casing structural member of the tire and the internal pressure application time, which is the amount of time internal pressure is applied. Note that the tire condition measurement unit can also measure the temperature history and the internal pressure application time. Next, based on the temperature history and the internal pressure application time, the casing life prediction unit 32 calculates any current physical property value that serves as a guide for predicting failure of the casing structural member. The casing life prediction unit 32 then predicts the remaining drivable distance of the vehicle, on which the tire is mounted, until the physical property value reaches a physical property value limit, set in advance, that corresponds to failure.

Calculation of Fuel Cost

The following is an example of the method by which the fuel cost calculation unit 34 calculates the fuel cost.

(1) The fuel cost calculation unit 34 acquires each tread wear life Lt from the database 31, i.e. the vehicle driving distance (km) until the tread wears to the point of being unusable.

(2) From the database 31, the fuel cost calculation unit 34 acquires a price on diesel fuel p (yen/L) and a fuel consumption F (L/km) when using each of the treads. Note that since data such as the price on diesel fuel p varies from day to day, information provided by another system can be received over the network 5 for automatic updating of the database 31.

(3) Using the following equation, the fuel cost calculation unit 34 calculates a fuel cost Pf (yen) from attachment of the tread until the tread becomes unusable.

$$Pf = p \times F \times Lt$$

(4) Note that instead of or in addition to calculating the fuel cost Pf, the carbon dioxide emission can be calculated. In order to calculate the carbon dioxide emission, information indicating the relationship between the amount of consumed fuel and carbon dioxide emission can be stored in advance in the database 31.

Recommended Tread Selection

The following illustrates an example of the method for tread selection used by the tread selection unit 33.

(1) As necessary, the tread selection unit 33 acquires the usage environment information from the database 31 and identifies a tread conforming to the user's usage environment. For example, the tread selection unit 33 identifies a studless tread in the case of driving on snowy roads and identifies a thick tread in the case of driving on rough roads. The tread that is identified can also change by season. At least one of the treads identified in this way is chosen, and steps (2) through (6) below are repeated for each chosen tread.

(2) The casing life prediction unit 32 predicts the remaining life of the casing, i.e. a remaining drivable distance D (km).

(3) The tread selection unit 33 acquires wear life information Lt for the identified tread from the database 31 and determines whether Lt is larger than D. If Lt is smaller than D, then the next tread for use is selected. This step is performed until the total value of Lt for each tread exceeds D.

(4) The fuel cost calculation unit 34 calculates a fuel cost Pf when using the tread.

(5) The tread selection unit 33 acquires a tread cost Pt and a maintenance cost Pm from the database 31.

(6) The tread selection unit 33 calculates the value of the following assessment function e.

$$e = aPt + bPm + cPf$$

In this equation, a, b, and c can be changed based on the user need information acquirable from the database 31. For example, when the user need information indicates "cost reduction", a, b, and c can be increased so as to increase the weight of cost during recommended tread selection.

On the other hand, if the user need information indicates "safe driving", supplementary services such as driving courses, regular tire inspection, and emergency road service can be presented to the user.

(7) The tread selection unit 33 selects a set of one or more treads with a small value for the assessment function e, for example a set of 10 treads in order from the smallest value for the assessment function e. The selected treads are the recommended treads. Note that instead of the above method, a recommended tread may be selected to optimize cost among treads for which a carbon dioxide reduction amount E, for example, exceeds a minimum value.

Operation Flow During Recommended Tread Selection

Figure 3:
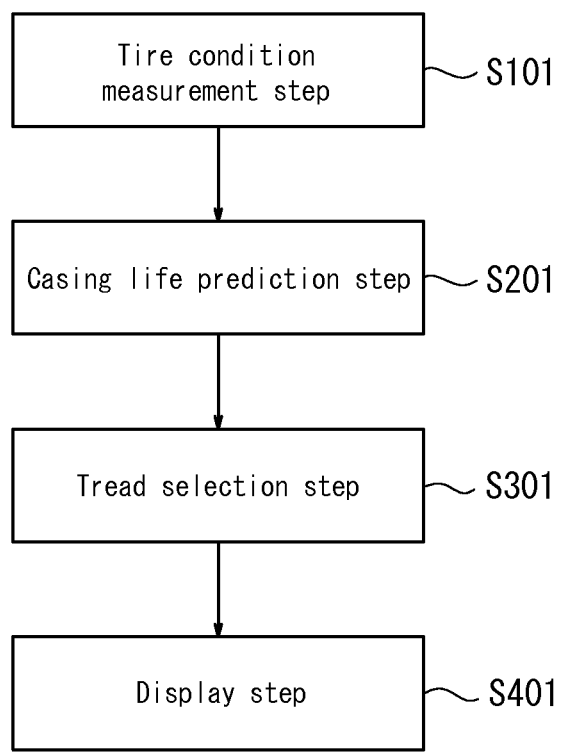
FIG. 3 is an example of a flowchart when selecting the tread of a tire.

With reference to the flowchart in FIG. 3, the following describes an example of the operation flow when the tread selection system 1 selects a tread for a tire. In step S101, a tire condition measurement step, the tire condition measurement unit including the TPMS 21, operation recording gauge 22, GPS 23, and the like is attached to at least one vehicle 2, and at least one characteristic value indicating the tire condition, the vehicle running condition, or both is measured. The information communication unit 24 transmits each measured characteristic value to the server 3. Note that instead of transmitting each characteristic value, the tire condition measurement unit can also store each measured characteristic value in a storage medium and cause the server 3 to read from the storage medium. In step S201, a casing life prediction step, the server 3 estimates the temperature history of each tire based on each characteristic value measured in step S101, calculates a current physical property value of the casing structural member based on the temperature history, and predicts the remaining drivable distance until the physical property value reaches a physical property value limit set in advance. In step S301, a tread selection step, the server 3 uses the tread wear life information stored in the database 31 to select a recommended tread in accordance with the remaining drivable distance predicted in step S201. For example, if the usage environment information is "snow accumulation, paved road" and the user need information is "cost reduction", a combination of treads yielding an optimal total (transportation cost) of the tread price, maintenance cost, and fuel cost is selected. In step S401, a display step, each recommended tread selected by the tread selection system 1 is displayed on the display screen 42 of the terminal 4. The printing unit 43 can print the recommended treads and the like selected by the tread selection system 1.

REFERENCE SIGNS LIST

1: Tread selection system
2: Vehicle
3: Server
4: Terminal
5: Network
21: TPMS (tire condition measurement unit)
22: Operation recording gauge (tire condition measurement unit)
23: GPS (tire condition measurement unit)
24: Information communication unit
31: Database
32: Casing life prediction unit
33: Tread selection unit
34: Fuel cost calculation unit
35: Information communication unit
41: Information communication unit
42: Display screen
43: Printing unit

The invention claimed is:

1. A method for tread selection to select a tread to attach to a tread side of a tire casing in a tire, comprising:
   a) measuring at least one characteristic value indicating at least a tire pressure with a tire condition measurement unit, the tire condition measurement unit having at least a TPMS for measuring the tire pressure, and transmitting the at least one characteristic value to a casing life prediction unit via radio wave;
   b) receiving the at least one characteristic value, estimating internal pressure application time equivalent to the amount of time internal pressure is applied based on the at least one characteristic value measured in step a); and predicting a remaining life of the tire casing based on the internal pressure application time using the casing life prediction;
   c) selecting, by a tread selection unit, at least one recommended tread in accordance with the remaining life of the tire casing predicted in step b) from among a plurality of treads attachable to the tire casing, using wear life information calculated in advance for each of the treads and stored in database; and
   d) transforming a display screen of a terminal to display the at least one recommended tread selected in step c).

2. The method for tread selection according to claim 1, wherein the tread selection unit selects the at least one recommended tread by further referring to user need information set in advance to reflect needs of a user of the tire.

3. The method for tread selection according to claim 1, wherein the tread selection unit selects the at least one recommended tread by further referring to cost information set in advance for each of the treads and to a rolling resistance coefficient calculated in advance for a tire using each of the treads.

4. The method for tread selection according to claim 1, wherein the tread selection unit selects the at least one recommended tread by further referring to usage environment information set in advance to indicate a usage environment of the tire.

5. The method for tread selection according to claim 1, wherein the tread selection unit selects the at least one recommended tread by further referring to maintenance cost information set in advance for the tire.

6. The method for tread selection according to claim 1, wherein the tread selection unit selects the at least one recommended tread by further referring to fuel cost information calculated in advance for a vehicle on which a tire using each of the treads is mounted.

7. The method for tread selection according to claim 1, wherein the tread selection unit selects the at least one recommended tread by further referring to carbon dioxide emission information calculated in advance for a vehicle on which a tire using each of the treads is mounted.

8. The method for tread selection according to claim 1, wherein said remaining life is a remaining drivable distance.

9. A tread selection system for selecting a tread to attach to a tread side of a tire casing in a tire, comprising:
   a vehicle having a tire condition measurement unit configured to measure at least one characteristic value indicating at least a tire pressure, the tire condition measurement unit having at least a TPMS for measuring the tire pressure, and transmit the at least one characteristic value to a casing life prediction unit by radio;
   a server in communication with the vehicle,
   the server comprising:
      the casing life prediction unit which is configured to receive the at least one characteristic value, estimate internal pressure application time equivalent to the amount of time internal pressure is applied based on the at least one characteristic value measured by the a tire condition measurement and predict a remaining life of the tire casing based on the internal pressure application time;
      a database configured to store wear life information calculated in advance for each of the treads attachable to the tire casing;
      a tread selection unit configured to select at least one recommended tread in accordance with the remaining life of the tire casing predicted by casing life prediction unit and the wear life information from among a plurality of treads; and
   a terminal having a display screen configured to display the at least one recommended tread selected by the casing life prediction unit.

* * * * *